US008443773B2

(12) United States Patent
Zurn

(10) Patent No.: US 8,443,773 B2
(45) Date of Patent: *May 21, 2013

(54) METHODS FOR CONTROLLING VALVES OF AN INTERNAL COMBUSTION ENGINE, DEVICES FOR CONTROLLING THE VALVES, AND ENGINES EMPLOYING THE METHODS

(76) Inventor: Anthony Nicholas Zurn, Detroit Lakes, MN (US)

( * ) Notice: Subject to any disclaimer, the term of this patent is extended or adjusted under 35 U.S.C. 154(b) by 192 days.

This patent is subject to a terminal disclaimer.

(21) Appl. No.: 13/022,238

(22) Filed: Feb. 7, 2011

(65) Prior Publication Data

US 2011/0126799 A1    Jun. 2, 2011

Related U.S. Application Data

(63) Continuation of application No. 11/974,236, filed on Oct. 12, 2007, now Pat. No. 7,882,811.

(51) Int. Cl.
    *F01L 1/34* (2006.01)
(52) U.S. Cl.
    USPC ............ 123/90.15; 123/90.17; 123/406.45
(58) Field of Classification Search ............ 123/90.15, 123/90.17, 406.41, 406.45
    See application file for complete search history.

(56) References Cited

U.S. PATENT DOCUMENTS

| 1,893,597 | A | | 1/1933 | Tranquillo |
| 3,334,618 | A | * | 8/1967 | Funiciello ............... 123/307 |
| 4,401,069 | A | | 8/1983 | Foley |
| 4,424,790 | A | | 1/1984 | Curtil |
| 4,490,971 | A | | 1/1985 | Hedelin |
| 4,561,253 | A | | 12/1985 | Curtil |
| 5,596,550 | A | | 1/1997 | Rowe, Jr. et al. |
| 5,937,807 | A | | 8/1999 | Peters et al. |
| 5,960,755 | A | | 10/1999 | Diggs et al. |
| 6,314,926 | B1 | | 11/2001 | Meneely et al. |
| 6,519,933 | B2 | | 2/2003 | Ogiso et al. |
| 6,830,020 | B1 | | 12/2004 | El Tahry et al. |
| 6,918,384 | B2 | | 7/2005 | Jehlik et al. |
| 7,036,483 | B2 | | 5/2006 | El Tahry et al. |
| 7,252,054 | B2 | * | 8/2007 | Weber et al. ............ 123/90.15 |
| 7,311,086 | B2 | | 12/2007 | Mahakul et al. |
| 7,882,631 | B2 | * | 2/2011 | Zurn ..................... 29/888.011 |
| 2004/0055548 | A1 | | 3/2004 | Williams |
| 2004/0194748 | A1 | | 10/2004 | Asai et al. |
| 2005/0087159 | A1 | | 4/2005 | Harmon |

* cited by examiner

*Primary Examiner* — Ching Chang
(74) *Attorney, Agent, or Firm* — Morriss O'Bryant Compagni

(57) ABSTRACT

Methods for improving the efficiency of internal combustion engines are disclosed. In one embodiment, a method of improving the efficiency of an internal combustion engine comprises controlling the motion of an exhaust valve associated with a cylinder of the internal combustion engine. Camshafts and internal combustion engines configured for performing methods of the instant invention are also disclosed.

16 Claims, 2 Drawing Sheets

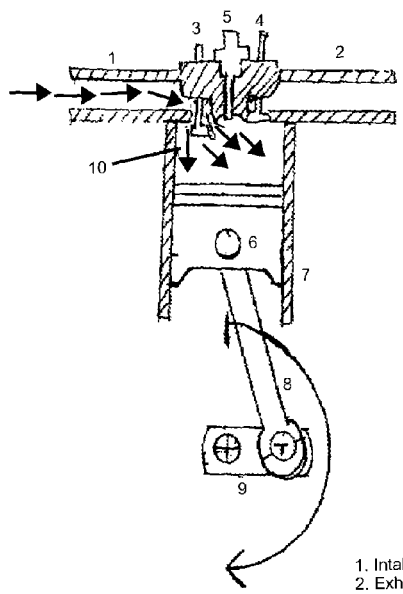
Figure 1 – Stroke 1
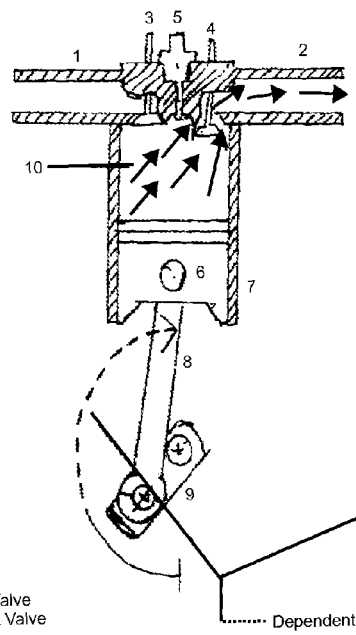
Figure 2A – Stroke 2
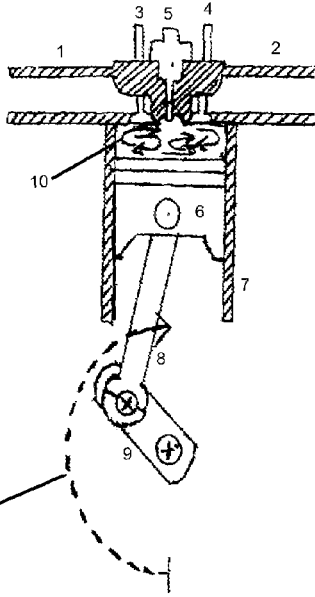
Figure 2B – Stroke 2
1. Intake
2. Exhaust
3. Intake Valve
4. Exhaust Valve
5. Injector
6. Piston
7. Cylinder
8. Connecting Rod
9. Crank Shaft
10. Air/Exhaust
11. Fuel
·········· Dependent on Timing

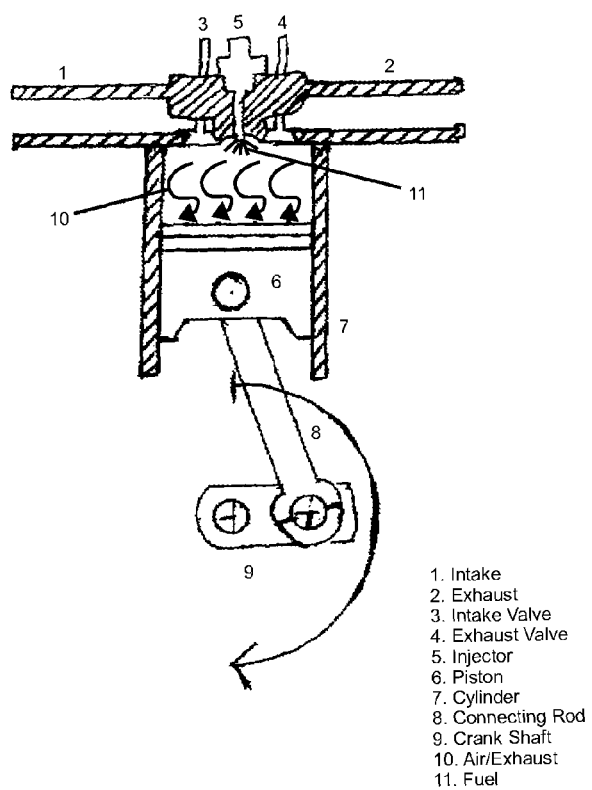
Figure 3 – Stroke 3
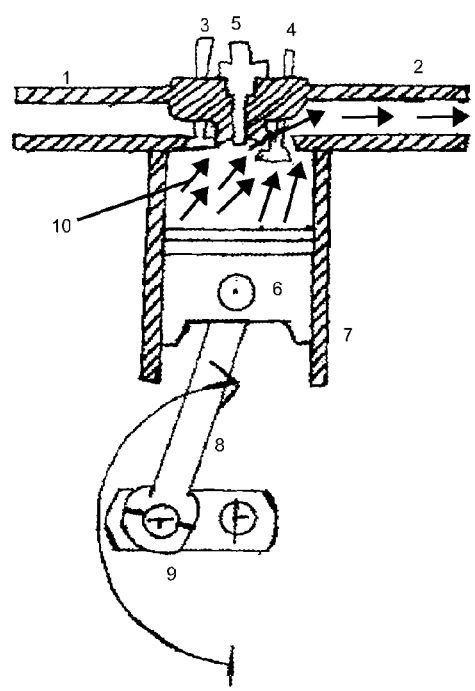
Figure 4 – Stroke 4
1. Intake
2. Exhaust
3. Intake Valve
4. Exhaust Valve
5. Injector
6. Piston
7. Cylinder
8. Connecting Rod
9. Crank Shaft
10. Air/Exhaust
11. Fuel

METHODS FOR CONTROLLING VALVES OF AN INTERNAL COMBUSTION ENGINE, DEVICES FOR CONTROLLING THE VALVES, AND ENGINES EMPLOYING THE METHODS

CROSS-REFERENCE TO RELATED APPLICATION

This application is a continuation of prior, co-pending U.S. application Ser. No. 11/974,236, filed Oct. 12, 2007, which itself claims the benefit under 35 U.S.C. 119(e) of U.S. Provisional Application Ser. No. 60/829,256, filed Oct. 12, 2006, each of the contents of which are incorporated by this reference in their entirety.

TECHNICAL FIELD

The present invention relates generally to engines and, more particularly, to methods for adjusting the movement of valves and increasing the efficiency in an internal combustion engine. The invention further relates to engines employing the methods disclosed herein.

BACKGROUND

The depletion of fossil fuels and increases in greenhouse gases has led to a worldwide demand for engines that power vehicles more efficiently. Further, increases in gasoline and diesel prices have consumers demanding that the engines that run the vehicles be more efficient.

In response to these demands from consumers, the automotive industry and the energy industry are attempting to develop vehicles and fuels that are more efficient and inexpensive. For instance, the automobile industry has developed so called "hybrid" engines for use in passenger cars, wherein the vehicles employing these "hybrid" engines get better gas mileage, thus, reducing the operating costs for these vehicles. The energy industry has also developed fuels for vehicles that are made from renewable energy sources. For instance, ethanol blended gasolines and biodiesel are becoming more available and cost competitive as compared to fuels that originate from fossil fuels.

Although these improvements have provided some relief and hope for consumers of gasoline and diesel fuels, there exists a need for engines that burn these fuels more efficiently as well as engines that last longer.

SUMMARY OF THE INVENTION

In each of its various embodiments, the present invention fulfills these needs by disclosing a method of moving at least one valve of an internal combustion engine that results in an engine having improved fuel efficiency and a longer life. An internal combustion engine configured for performing the methods of the instant invention is further described.

In one embodiment, a method of combusting fuel in an internal combustion engine comprises introducing air into a cylinder of an internal combustion engine, releasing a portion of the air from the cylinder with an exhaust valve associated with a camshaft and compressing the remaining air in the cylinder. The method further includes injecting fuel into the cylinder, igniting the remaining portion of the compressed air and the fuel in the cylinder and exhausting the ignited fuel-air mixture from the cylinder with the exhaust valve associated with the camshaft.

In yet another embodiment, a method of moving a valve in an internal combustion engine includes opening an intake valve associated with a cylinder during a first stroke of a piston associated with the cylinder and opening an exhaust valve of the cylinder during a second stroke of the piston with a camshaft having two lobes in operable communication with the exhaust valve. The method also includes performing a third stroke or power stroke of the piston and opening the exhaust valve of the cylinder during a fourth stroke of the piston with the camshaft.

In yet a further embodiment, a method of timing valves in an internal combustion engine comprises associating an intake valve and an exhaust valve with a cylinder of an internal combustion engine and configuring a camshaft with at least two lobes that move the exhaust valve to lift or open the exhaust valve at least two times during a cycle of the internal combustion engine.

In other embodiments, internal combustion engines configured for performing the methods of the instant invention are described. The internal combustion engines may be configured to burn fuels including, but not limited to, gasoline, diesel, biodiesel, an alcohol, propane or any combination thereof.

In yet an additional embodiment, a camshaft configured for controlling a valve in an internal combustion engine that performs the methods of the present invention is disclosed.

BRIEF DESCRIPTION OF THE DRAWINGS

FIG. 1 illustrates one embodiment of acts involved in an intake stroke of a piston of an internal combustion engine of the present invention.

FIGS. 2A and 2B depict an embodiment of two acts involved in a compression stroke of a piston in an internal combustion engine of the instant invention.

FIG. 3 shows one embodiment of acts involved in a power stroke of a piston in an internal combustion engine of the instant invention.

FIG. 4 illustrates an embodiment of acts involved in an exhaust stroke of a piston in an internal combustion engine of the present invention.

BEST MODE OF THE INVENTION

The present invention is directed towards methods of controlling the movement of air in an internal combustion engine. By opening an exhaust valve of the internal combustion engine more than once during two revolutions of the internal combustion engine, a valve and a seat and, thus, the internal combustion engine operate at a lower temperature than conventional internal combustion engines. Further, by releasing a portion of air from the cylinder before the compressed fuel-air mixture is burned, the internal combustion uses less fuel than conventional engines.

A method of combusting fuel in an internal combustion engine includes introducing air into a cylinder of an internal combustion engine, releasing a portion of the air from the cylinder, compressing a remaining portion of the air in the cylinder, introducing fuel into the cylinder, igniting the remaining portion of the compressed air and the fuel in the cylinder, and exhausting the ignited fuel-air mixture from the cylinder. In the method, the remaining portion of the air in the cylinder may be less than an amount of air introduced into the cylinder. The method may further include opening or lifting an exhaust valve of the internal combustion engine at least two times during a cycle of the internal combustion engine.

Another method of the present invention includes opening an intake valve associated with a cylinder during a first stroke of a piston associated with the cylinder, opening an exhaust valve of the cylinder during a second stroke of the piston, performing a third stroke of the piston, and opening the exhaust valve of the cylinder during a fourth stroke of the piston. In the method, the opening of the exhaust valve may be effectuated by moving a camshaft associated with the internal combustion engine.

A further method of the present invention includes associating an intake valve and an exhaust valve with a cylinder of an internal combustion engine and configuring a camshaft that moves the exhaust valve to open, lift, or open and lift the exhaust valve at least two times during a cycle of the internal combustion engine.

An internal combustion engine is configured to perform any of the methods of the present invention. The internal combustion engine may be configured to run on at least one of diesel, biodiesel, gasoline, an alcohol, an alcohol blended fuel, propane or any combinations thereof. In a further embodiment, the internal combustion engine may be configured with a carburetor or a fuel injection system. In another embodiment, the internal combustion engine runs at a cooler temperature than a conventional engine. In yet a further embodiment, an exhaust valve and a seat of the internal combustion engine are at a cooler temperature during operation of the internal combustion engine as compared to a conventional engine.

A camshaft configured to move the valves of an internal combustion engine capable of performing any of the methods of the present invention is also disclosed.

A vehicle comprising an internal combustion engine of the present invention is also disclosed. The vehicle may be an automobile, a semi-tractor, a tractor, a train or a boat.

In another embodiment, the internal combustion engine may be associated with a generator for generating electricity.

In the exemplary embodiments, an internal combustion engine that is more efficient than a conventional engine is described. While the present invention is described in terms of certain specific, exemplary embodiments, the specific details of the exemplary embodiments are not meant to be limiting. Various combinations or modifications of the exemplary embodiments may be made without departing from the scope of the invention.

EXAMPLE 1

Referring now to FIG. 1, there is shown a partial view of one embodiment of an internal combustion engine depicting an intake stroke of the internal combustion engine. FIG. 1 depicts an intake 1 and an exhaust 2 of a cylinder 7. The cylinder 7 is also associated with an intake valve 3, an exhaust valve 4, an injector 5, and a piston 6. The piston 6 is operably connected to a connector rod 8 which drives crankshaft 9. As illustrated in FIG. 1, the cylinder 7 is filled with air shown with arrows 10 as the piston 6 moves downward in stroke one of the piston 6. It will be apparent by those of ordinary skill in the art that reference to "downward" or "upward" in describing the present invention is exemplary based on the orientation of the internal combustion engine in the FIG. 1.

FIGS. 2A and 2B depict an upward motion of the piston 6 after the downward motion of FIG. 1. In this exemplary embodiment, the piston 6 moves in an upward direction and the air 10 is compressed in stroke two of FIGS. 2A and 2B. During stroke two, the exhaust valve 4 is opened to release a portion of the volume of air in the cylinder 7, the exhaust valve 4 is subsequently closed, and the remaining portion of the air 10 not released is compressed in the cylinder 7 during stroke two. Thus, the exhaust valve 4 is opened to release some of the air 10 and closed such that the remaining air 10 may be compressed during stroke two of the piston 6. The exhaust valve 4 may be opened and closed during stroke two in any manner known by those of ordinary skill in the art. In one embodiment, the exhaust valve 4 is opened and closed by configuring a camshaft of the internal combustion engine in an appropriate fashion. For instance, the camshaft that controls the opening and closing of the exhaust valve 4 may be ground or configured to have two lobes that open the exhaust valve 4 twice during two revolutions of the crankshaft.

By opening the exhaust valve 4 during stroke two, less than 100% of the air 10 introduced into the cylinder 7 is compressed during stroke two. By removing a portion of the air 10 from the cylinder 7 and using approximately the same compression pressure as an engine having 100% of the air compressed, it is expected that less fuel will be used. The compression may be maintained at about the same compression pressure by decreasing a volume of the cylinder. In various embodiments, the volume of the cylinder may be decreased by modifying (i.e., shaving) the heads associated with the cylinder or by using high dome pistons. In one embodiment, a 72 cubic centimeter (cc) cylinder may be reduced to about a 36 cc cylinder, and about 50% of the air may be removed from the cylinder 7 by opening the exhaust valve 4 during stroke two, thus maintaining approximately the same compression in the 36 cc cylinder as the 72 cc (cubic centimeter) cylinder, but using less air and, thus, less fuel.

The release of the portion of the air 10 before ignition in the cylinder 7 also enables the exhaust valve 4 and associated seat to be cooled during operation of the internal combustion engine, thus enabling the internal combustion engine of the present invention to run at a cooler temperature as compared to an internal combustion engine that is not configured to open or move the exhaust valve twice during two revolutions of the crankshaft. The amount of air 10 that will be compressed in stroke two may be determined with routine experimentation by those of ordinary skill in the art and may be optimized depending on the number of cylinders, the number of valves, the size of the cylinders, the type of fuel, or combinations thereof used in the internal combustion engine.

Referring now to FIG. 3, stroke three or the power stroke of the piston 6 is depicted. In the power stroke, fuel 11 is introduced into the cylinder 7 through the injector 5 and into the compressed air. Since less than 100% of the air that is introduced into the cylinder 7 is compressed in the cylinders of the present invention as compared to a conventional engine, the engine may also be configured to introduce less fuel into the cylinder. In one embodiment where 50% of the air introduced into the cylinder is removed, the amount of fuel introduced into the cylinder may also be reduced to about 50% of the fuel that would be introduced into a cylinder of a conventional engine.

It will be appreciated by those of ordinary skill in the art that the amount of fuel introduced into the cylinder may vary and will be determined, at least in part, by an amount of air that is removed from the cylinder and/or compressed in the cylinder. Ignition of the fuel-compressed air mixture during the power stroke causes the piston 6 to move downward and impart power to the internal combustion engine. By compressing less than 100% of the air 10 introduced in the cylinder and introducing a smaller amount of fuel in the cylinder, the internal combustion engine and, thus, the power stroke use less fuel in the internal combustion engine of the present invention than the power stroke in a conventional internal combustion engine that compresses 100% of the air introduced in the cylinder, Further, the fuel of the internal combustion of the instant invention is used more efficiently as compared to that of a conventional internal combustion engine because a full stroke of the piston 6 is being expanded, while using less fuel than a conventional engine.

FIG. 4 depicts an exhaust stroke (stroke 4) of the piston 6 of the cylinder 7 after the power stroke, thus removing the ignited fuel compressed air mixture.

EXAMPLE 2

In another embodiment, a camshaft is designed for a Cummins brand 5.9 Liter Diesel engine having six cylinders and 12 valves offered in a 1997 Dodge brand pickup as follows. An exhaust camshaft of the Cummins brand 5.9 Liter Diesel engine is designed with the specifications of the stock camshaft and the addition of a second lobe placed on the exhaust camshaft in order to open the exhaust valve during a second or compression stroke of the piston. The exhaust camshaft is designed to have the second lobe ground on the exhaust camshaft according to the following specification: in a range of from about 20° to about 30° BBDC (before bottom dead center) and in a range from about 91° to about 101° ABDC (after bottom dead center). In one illustrative embodiment, the exhaust camshaft is designed to have the second lobe ground to about 25° BBDC and about 96° ABDC.

The exhaust camshaft of this example is placed into a Cummins brand 5.9 Liter Diesel engine and the engine is configured for operation. In other embodiments, the engine may be configured with a turbo charger, a supercharger, or without the turbo charger or supercharger.

The exemplary embodiments described herein are not intended to limit the invention or the scope of the appended claims. Various combinations and modifications of the examples or embodiments described herein may be made without departing from the scope of the present invention and all modifications and combinations are meant to be included within the scope of the present invention.

What is claimed is:

1. A method of combusting fuel in an internal combustion engine, the method comprising:
   introducing air into a cylinder of an internal combustion engine;
   releasing a portion of the air from the cylinder during a compression stroke of the internal combustion engine;
   compressing a remaining portion of the air in the cylinder with a piston such that a compression pressure of the remaining portion of the compressed air is the same as a compression pressure of an entire amount of the air introduced into the cylinder and compressed without releasing the portion of the air from the cylinder;
   introducing fuel into the cylinder;
   igniting the remaining portion of the compressed air and the fuel in the cylinder; and
   exhausting the ignited fuel-air mixture from the cylinder.

2. The method according to claim 1, wherein the remaining portion of the air in the cylinder is less than the entire amount of air introduced into the cylinder.

3. The method according to claim 1, further comprising opening or lifting an exhaust valve of the internal combustion engine at least two times during a cycle of the internal combustion engine.

4. The method according to claim 1, further comprising opening or lifting an intake valve of the internal combustion engine at least two times during a cycle of the internal combustion engine.

5. An internal combustion engine configured to perform the method of claim 1.

6. The internal combustion engine of claim 5, wherein the internal combustion engine runs at a cooler temperature than an engine not configured to release the portion of the air from the cylinder during the compression stroke.

7. The internal combustion engine of claim 5, wherein the internal combustion engine is configured to run on diesel, biodiesel, or a combination thereof.

8. The internal combustion engine of claim 5, wherein the internal combustion engine is configured to run on gasoline, an alcohol, propane or a combination thereof.

9. The internal combustion engine of claim 8, wherein the internal combustion engine is configured with a fuel injection system or a carburetor.

10. The method according to claim 1, wherein the portion of the air is released from the cylinder with an exhaust valve associated with the camshaft.

11. The method according to claim 1, wherein the air released from the cylinder during the compression stroke is not ignited.

12. The method according to claim 1, wherein the piston is a high dome piston.

13. A method of configuring an internal combustion engine, the method comprising:
    associating an intake valve and an exhaust valve with a cylinder of an internal combustion engine;
    configuring a camshaft to release a portion of air introduced into the cylinder from the cylinder during a compression stroke and a remaining portion of air in the cylinder is compressed during the compression stroke;
    associating a piston and a head with the cylinder of the internal combustion engine; and
    configuring the piston, the head or a combination thereof such that during the compression stroke, a pressure of the remaining portion of the compressed air is substantially the same as a pressure of an entire amount of air introduced into the cylinder and compressed during the compression stroke.

14. An internal combustion engine configured to perform the method of claim 13.

15. The method according to claim 13, wherein the piston comprises a high dome piston.

16. The method according to claim 13, wherein configuring the head comprises shaving the head associated with the cylinder.

* * * * *